(12) United States Patent
Hartman et al.

(10) Patent No.: US 11,524,452 B2
(45) Date of Patent: Dec. 13, 2022

(54) 3D PRINTER WITH A UV LIGHT ABSORBING AGENT

(71) Applicant: HEWLETT-PACKARD DEVELOPMENT COMPANY, L.P., Houston, TX (US)

(72) Inventors: Aja Hartman, Palo Alto, CA (US); Krzysztof Nauka, Palo Alto, CA (US); Lihua Zhao, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1091 days.

(21) Appl. No.: 16/074,276

(22) PCT Filed: Oct. 31, 2016

(86) PCT No.: PCT/US2016/059693
§ 371 (c)(1),
(2) Date: Jul. 31, 2018

(87) PCT Pub. No.: WO2018/080537
PCT Pub. Date: May 3, 2018

(65) Prior Publication Data
US 2021/0187834 A1    Jun. 24, 2021

(51) Int. Cl.
*B29C 64/165* (2017.01)
*B33Y 10/00* (2015.01)
(Continued)

(52) U.S. Cl.
CPC .......... *B29C 64/165* (2017.08); *B29C 64/209* (2017.08); *B29C 64/393* (2017.08);
(Continued)

(58) Field of Classification Search
CPC ... B29C 64/165; B29C 64/209; B29C 64/393; B33Y 10/00; B33Y 30/00; B33Y 50/02;
(Continued)

(56) References Cited

U.S. PATENT DOCUMENTS

| 9,114,567 | B2 | 8/2015 | Monsheimer et al. |
| 2008/0268384 | A1* | 10/2008 | Kasperchik .............. B41M 5/34 430/334 |
| 2016/0136889 | A1 | 5/2016 | Rolland et al. |

FOREIGN PATENT DOCUMENTS

| CN | 103231513 | A | 8/2013 |
| CN | 203649400 | * | 6/2014 |

(Continued)

OTHER PUBLICATIONS

English translation of CN 203649400 (Year: 2014).*
(Continued)

*Primary Examiner* — Larry W Thrower
(74) *Attorney, Agent, or Firm* — HPI Patent Department

(57) ABSTRACT

According to an example, a three-dimensional (3D) printer may include a delivery device to deposit a light absorbing agent onto selected areas of a layer of build material particles, in which the light absorbing agent absorbs light having wavelengths that are around the ultraviolet wavelength range. The 3D printer may also include a light source to apply light onto the selectively deposited light absorbing agent and the layer of the build material particles, in which the light absorbing agent absorbs light around the ultraviolet wavelength range from the applied light and becomes heated to a temperature that causes the build material particles upon which the light absorbing agent has been deposited to melt and to fuse together following cessation of the application of the light.

5 Claims, 3 Drawing Sheets

(51) Int. Cl.
     *B33Y 30/00*          (2015.01)
     *B33Y 50/02*          (2015.01)
     *B29C 64/209*        (2017.01)
     *B29C 64/393*        (2017.01)

(52) U.S. Cl.
     CPC ............... *B33Y 10/00* (2014.12); *B33Y 30/00* (2014.12); *B33Y 50/02* (2014.12); *B29K 2995/003* (2013.01); *B29K 2995/0021* (2013.01); *B29K 2995/0026* (2013.01)

(58) Field of Classification Search
     CPC .... B29K 2995/0021; B29K 2995/0026; B29K 2995/003
     See application file for complete search history.

(56) References Cited

FOREIGN PATENT DOCUMENTS

| | | |
|---|---|---|
| CN | 203649400 U | 6/2014 |
| RU | 2176600 C2 | 12/2001 |
| WO | 0064653 A2 | 11/2000 |
| WO | 2014085809 A1 | 6/2014 |

OTHER PUBLICATIONS

Moynihan, "Mesmerizing 3-d Printer Forms Objects Out Of Ooze—and Fast", Wired, Retrieved from internet—https://www.wired.com/2015/03/mesmerizing-3-d-printer-forms-objects-oozeand-fast/, Mar. 18, 2015, 4 Pages.

\* cited by examiner

3D PRINTER WITH A UV LIGHT ABSORBING AGENT

BACKGROUND

In three-dimensional (3D) printing, an additive printing process is often used to make three-dimensional solid parts from a digital model. 3D printing is often used in rapid product prototyping, mold generation, mold master generation, and short-run manufacturing. Some 3D printing techniques are considered additive processes because they involve the application of successive layers of material to an existing surface (template or previous layer). 3D printing often requires curing or fusing of the building material, which for some materials may be accomplished using heat-assisted extrusion, melting, or sintering, and for other materials may be accomplished through curing of polymer-based build materials.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
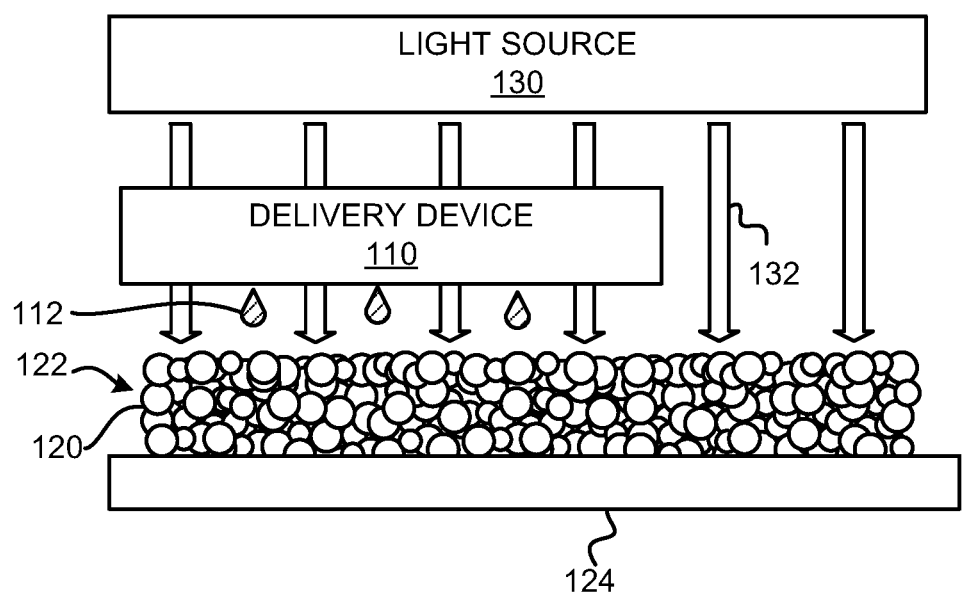
FIG. 1 shows a simplified block diagram of an example 3D printer.

Some 3D printers utilize absorption of colorants and additional near infrared dye (NIRD) to absorb mostly infrared energy emitted by tungsten-halogen (QTH) fusing lamps to fuse build material particles together. NIRD frequently absorbs some wavelengths in the visual spectrum and thus has a color tint, which may be transferred to the build material particles, thereby creating off-white parts. Thus, it may not be possible to maintain the color of the build material particles using techniques that rely upon NIRD for the fusing of the build material particles.

Disclosed herein are 3D printers and methods for melting and fusing build material particles using an ultraviolet (UV) light absorbing agent, which may enable the formation of parts that do not have a color other than the color of the build material particles. In this regard, the 3D printers and methods disclosed herein may enable the formation of white parts from white build material particles. Generally speaking, the UV light absorbing agent may be transparent or reflective in the visible spectrum and may absorb light in the UV wavelength spectrum. The UV light absorbing agent may also become heated through absorption of the light in the UV wavelength spectrum, which may cause the build material particles upon which the UV light absorbing agent has been deposited to melt and subsequently fuse together while being cooled. Thus, the UV light absorbing agent and a UV light source (or a light source that emits light across a broad spectrum) may be used together to melt and fuse build material particles without changing the color of the build material particles.

In other examples, a mixture of the UV light absorbing agent and a second agent that has a property that differs from a property of the UV light absorbing agent may be applied to the build material particles. For instance, the second agent may not absorb light around the UV wavelength range. Instead, for instance, the second agent may absorb light around the infrared (IR) wavelength range. In this regard, the second agent may also become heated in the presence of light in the IR wavelength range. In addition or as another example, the second agent may be a colored fluid, e.g., a colored ink or dye, and may change the color of the build material particles. In addition or as a further example, the second agent may modify a material property of the build material particles. In any regard, and as discussed herein, the UV light absorbing agent may be mixed with the second agent prior to being deposited onto the build material particles or may be mixed with the second agent on the build material particles. In the first instance, the mixture may be delivered by a common delivery device and in the second instance, the UV light absorbing agent and the second agent may be delivered by separate delivery devices.

Light may be applied to melt the build material particles upon which the UV light absorbing agent, and in certain instances, the second agent, has been deposited. The light may have wavelengths that are around the UV wavelength range or may have a wide range of wavelengths including around the UV wavelength range. The light may also include wavelengths around the IR wavelength range, which may assist in melting the build material particles in instances in which a second agent including IR absorbing agent is mixed with the UV light absorbing agent.

Before continuing, it is noted that as used herein, the terms "includes" and "including" mean, but is not limited to, "includes" or "including" and "includes at least" or "including at least." The term "based on" means "based on" and "based at least in part on."

With reference first to FIG. 1, there is shown a simplified block diagram of an example 3D printer 100. The 3D printer 100 may also equivalently be termed a 3D fabricating device, a 3D additive manufacturing device, etc., and may be implemented to fabricate 3D parts. As shown, the 3D printer 100 may include a delivery device 110 that may be controlled to deposit a light absorbing agent 112 onto selected areas of a layer 122 of build material particles 120. As discussed in greater detail herein, the light absorbing agent 112 may absorb light having wavelengths that are around the ultraviolet (UV) wavelength range and may become heated. For instance, the light absorbing agent 112 may become heated to a sufficient temperature to cause build material particles 120 upon which the light absorbing agent 112 has been deposited to melt when light containing wavelengths in the UV wavelength range is applied onto the light absorbing agent 112.

The UV wavelength range discussed herein may include wavelengths of light that range from about 200 nm to about 400 nm. In other examples, the UV wavelength range discussed herein may include wavelengths of light that range from about 320 nm to about 380 nm. In still other examples, the UV wavelength range discussed herein may include wavelengths of light that fall below 420 nm.

According to an example, the light absorbing agent 112 may be colorless in a visible spectrum, i.e., transparent between the UV and IR wavelength ranges, and the build material particles 120 may have a white or other light color. In another example, the light absorbing agent 112 may be white (i.e., may reflect all light in a visible spectrum). In one regard, therefore, the build material particles 120 may be fused together to form a white or other light-colored part without the light absorbing agent 112 adding color to the formed part.

According to an example, the delivery device 110 may be scanned across the layer 122 in one or multiple directions to enable droplets of the light absorbing agent 110 to be delivered to selected areas of the layer 122 of build material particles 120. In addition or in other examples, the delivery device 110 may remain stationary and the layer 122 may move with respect to the fluid delivery device 110. In still other examples, both the delivery device 110 and the layer 122 may move with respect to each other. According to examples, the delivery device 110 may be a thermal inkjet printhead, a piezoelectric printhead, or the like, although the delivery device 110 may include other types of fluid delivery devices. Additionally, multiple delivery devices may be employed to deliver the same or multiple types of agents as discussed in greater detail herein.

The layer 122 of build material particles 120 may be formed through operation of a recoater (not shown) to spread a plurality of build material particles 120 to form the layer 122 of build material particles 120 over a surface 124. The surface 124 may be a build platform or a previously formed layer 122 of build material particles 120. The build material particles 120 may be formed of any suitable additive manufacturing materials such as plastics, nylons, polymers, metals, and the like. The build material particles 120 may also have micron-level dimensions, for instance, the build material particles 120 may have dimensions, e.g., widths, diameters, or the like, that are generally between about 5 μm and about 100 μm. In other examples, the build material particles 120 may have dimensions that are generally between about 30 μm and about 60 μm. The build material particles 120 may generally have spherical shapes, for instance, as a result of processes employed to fabricate the build material particles. The term "generally" may be defined as including that a majority of the build material particles have the specified sizes and spherical shapes. In other examples, the term "generally" may be defined as a large percentage, e.g., around 80% or more of the build material particles have the specified sizes and spherical shapes.

The recoater may have a cylindrical configuration and may be rotated and translated over the build material particles 120 to form the build material particles 120 into the layer 122. By way of example, the recoater may be formed of a metallic material and may have a polished or a textured surface. The recoater may be employed to form the layer 122 to have a substantially uniform thickness across the surface 124. In other examples, the recoater may be a doctor blade or other suitable device for spreading the build material particles 120 into the layer 122. In an example, the thickness of the layer 122 may range from about 90 μm to about 110 μm, although thinner or thicker layers may also be used. For example, the thickness of the layer 122 may range from about 20 μm to about 200 μm, or from about 50 μm to about 200 μm.

The light absorbing agent 112 or equivalently the UV light absorbing agent 112 may be any suitable material that may absorb light around the UV wavelength range as discussed herein. Examples of suitable materials may include but are not limited to any of: 2-ethylhexyl 4-methoxycinnamate (OMC), Benzylidene Malonate Polysiloxane (BPM), Bis-Ethylhexyloxyphenol Methoxyphenyl Triazine (BEMT), Butyl Methoxydibenzoylmethane (BMBM), Diethylamino Hydroxybenzoyl Hexyl Benzoate (DHHB), Disodium Phenyl Dibenzimidazole Tetrasulfonate (DPDT), Drometrizole Trisiloxane (DTS), Ethylhexyl Methoxycinnamate (EHMC), Ethylhexyl Triazone (EHT), Methylene Bis-Benzotriazolyl Tetramethylbutylphenol (MBBT), Octocrylene (OCR), Phenylbenzimidazole Sulfonic Acid (PBSA), Terephthalylidene Dicamphor Sulfonic Acid (TDSA), Tris-Biphenyl Triazine (TBPT), and oxybenzone (OB). By way of particular example, the light absorbing agent 112 is DPDT or TDSA. In other particular examples, the light absorbing agent 112 is MBBT or TBPT.

As also shown in FIG. 1, the 3D printer 100 may include a light source 130 to apply light 132 onto the deposited light absorbing agent 112 and the layer 122 of build material particles 120. The light source 130 may be a light emitting diode, a laser, a lamp, or the like. By way of particular example, the light source 130 may be strobe lamp, such as a Xenon (Xe) strobe lamp. In addition, the light source 130 may emit light 132 across a wide spectrum of wavelengths. For instance, the light source 130 may emit light 132 that ranges in wavelengths from around the UV wavelength range to nearly the infrared (IR) range. In this example, a filter may be employed to block light having wavelengths that are above the UV wavelength range, e.g., light having wavelengths above about 400 or 420 nm. In other examples, the light source 130 may emit light across a narrower range of wavelengths, e.g., around the UV wavelength range. Although a single light source 130 has been depicted in FIG. 1, the 3D printer 100 may include multiple light sources 130 that emit light at the same wavelengths with respect to each other or at different wavelengths with respect to each other. For instance, one of the multiple light sources 130 may emit light around the UV wavelength range and another one of the multiple light sources 130 may emit light around the IR wavelength range.

Although not shown, a processor may control the light source 130 to apply short bursts of light 132. For instance, the processor may control the light source 130 to flash a single time at the certain energy level, e.g., between about 7 J/cm$^2$ and about 20 J/cm$^2$ for about 15-20 ms. In other examples, the processor may vary the number of times and/or the durations at which the light source 130 is flashed. For instance, the number of times and/or durations may vary for different types of materials, particle sizes, and/or distribution of build material particles 120. According to examples, the light source 130 may be a single energy source that may be operated at multiple energy levels. In other examples, the light source 130 may be a plurality of light sources. In any of these examples, the light source 130 may be a photonic fusing source, such as, a Xenon (Xe) strobe lamp, although other types of strobe lamps may be implemented.

In some examples, the light source 130 may emit light 132 simultaneously onto a large section of the light absorbing agent 112. In these examples, the light source 130 may be positioned at a fixed location above the layer 122 of the build material particles 120. In other examples, the light source 130 may be scanned across the layer 122 in one or multiple directions to enable droplets of the light absorbing agent 112 to be delivered to selected areas of the layer 122 of build material particles 120. In addition or in other examples, the delivery device 110 may remain stationary and the layer 122 of build material particles 120 may move with respect to the delivery device 110. In still other examples, both the delivery device 110 and the layer 122 may move with respect to each other.

The light absorbing agent 112 may absorb light around the UV wavelength range from the applied light 132. Absorption of the light 132 may cause the light absorbing agent 112 to absorb light around the UV wavelength range from the applied light 132 and may become heated to a temperature that causes the build material particles 120 upon which the light absorbing agent 112 has been deposited to melt. Additionally, the melted build material particles 120 may fuse together following cessation of the application of the light 132 and subsequent cooling of the build material particles 120. As the light absorbing agent 112 may merely convert the absorbed light into heat and may convey the heat to the underlying build material particles 120, the build material particles 120 may merely melt and fuse together without their chemical compositions changing.

According to an example, the light absorbing agent 112 and the light source 130 may be tuned with respect to each other with regard to the build material particles 120. That is, the light absorbing agent 112 and the light source 130 that may operate together to cause the build material particles 120 to adequately melt may be included in the 3D printer 100. For instance, the wavelengths at which the light source 130 outputs light 132 may be tuned to the wavelengths at which the light absorbing agent 112 absorbs light. In addition, or in other examples, the volumes at which the light absorbing agent 112 are applied to the build material particles 120 may be varied depending upon the energy level applied by the light absorbing agent 112 and/or characteristics, such as material, size, distribution, etc., of the build material particles 120.

Moreover, or in other examples, the amount of energy applied onto the layer 122 of the build material particles 120 by the light source 130 may be varied depending upon the light absorption properties of the light absorbing agent 112 and/or characteristics, such as material, size, distribution, etc., of the build material particles 120. Accordingly, for instance, either or both of the volume of light absorbing agent 112 and the energy output by the light source 130 may be varied depending upon the properties of the build material particles 120. That is, either or both of the delivery device 110 and the light source 130 may be controlled to cause the build material particles 120 to sufficiently melt.

According to examples, the light absorbing agent 112 may be mixed with a second agent prior to being delivered on the layer 122 of build material particles 120. In these examples, the delivery device 110 may deliver a mixture of the light absorbing agent 112 and the second agent. For instance, the second agent may be a coloring agent, such as an ink or a dye, and may be mixed with the light absorbing agent 112 such that the mixture of the light absorbing agent 112 and the second agent may color the build material particles 120. As other examples, the second agent may be another light absorbing agent that is to absorb light having wavelengths outside of the UV wavelength range, e.g., around the IR wavelength range, and may be mixed with the light absorbing agent 112. In these examples, the second agent may absorb light in the infrared (IR) wavelength range. As further examples, the second agent may be an agent that modifies a material property of the build material particles upon which the second agent has been deposited. The material property may include, for instance, surface properties such as roughness, translucency, elasticity, strength, conductivity, transformative materials, and the like. In these examples, the second agent may include any of rigidifiers, plasticizers, conductors, flame retardants, surface property modifiers, translucency modifiers, elasticity modifiers, strength modifiers, conductivity modifiers, transformative materials, and the like. In still other examples, the light absorbing agent 112 and the second agent (and other agents) may be mixed through application of the light absorbing agent 112 and the second agent on the layer 122 by multiple delivery devices as discussed herein.

Figure 2:
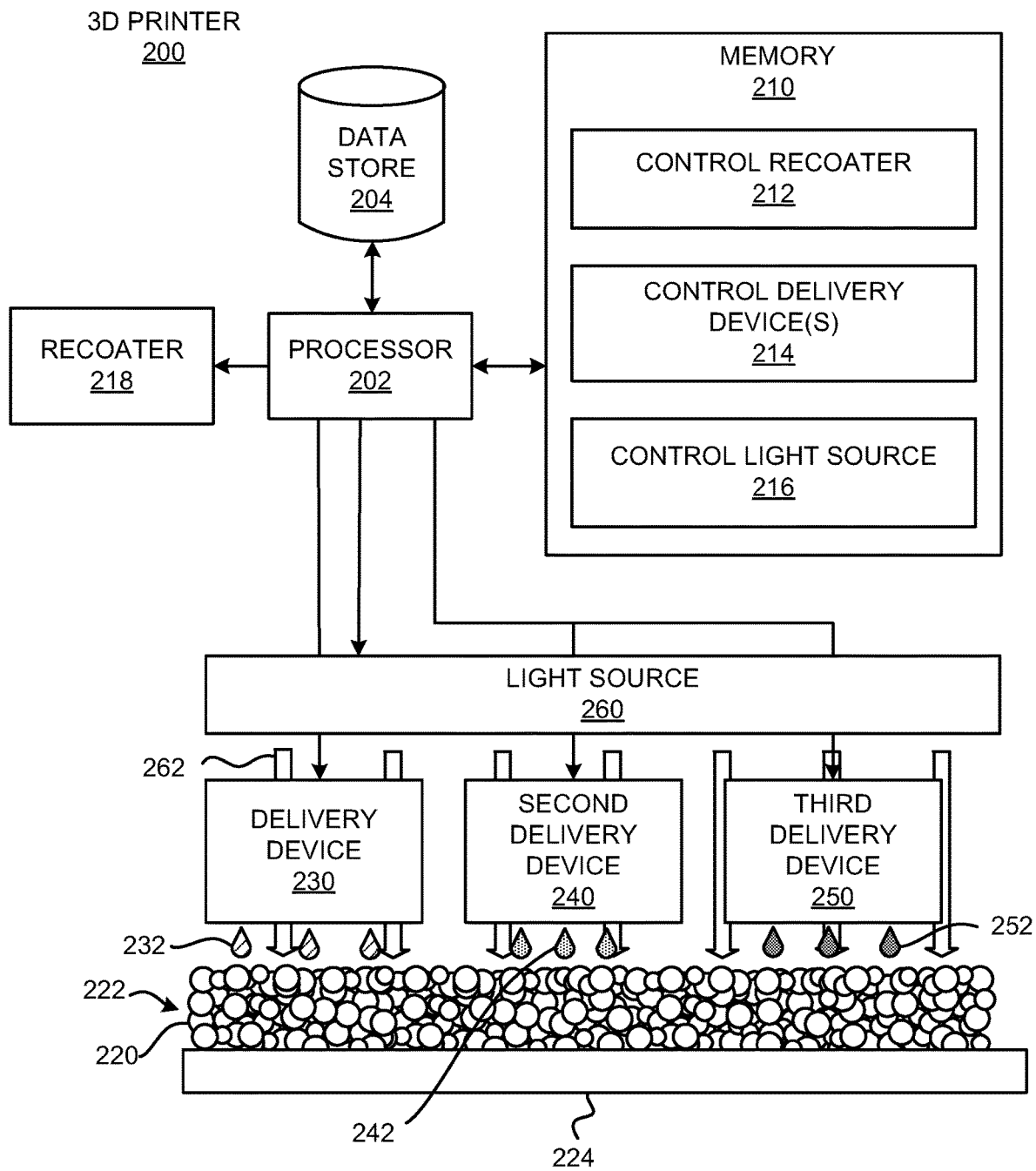
FIG. 2 shows a simplified block diagram of another example 3D printer.

Turning now to FIG. 2, there is shown a simplified block diagram of another example 3D printer 200. The 3D printer 200 may include a processor 202, a data store 204, and a memory 210. The processor 202 may control operations of the 3D printer 200 and may be a semiconductor-based microprocessor, a central processing unit (CPU), an application specific integrated circuit (ASIC), and/or other hardware device. The memory 210 may have stored thereon machine readable instructions 212-216 (which may also be termed computer readable instructions) that the processor 202 may execute. The memory 210 may be any electronic, magnetic, optical, or other physical storage device that contains or stores executable instructions. Thus, the memory 210 may be, for example, Random Access Memory (RAM), an Electrically Erasable Programmable Read-Only Memory (EEPROM), a storage device, an optical disc, and the like. The memory 210, which may also be referred to as a computer readable storage medium, may be a non-transitory machine-readable storage medium, where the term "non-transitory" does not encompass transitory propagating signals. The data store 204 may also be a data storage device that may store data in a volatile or a nonvolatile manner.

The processor 202 may fetch, decode, and execute the instructions 212 to control a recoater 218 to spread a plurality of build material particles 220 to form a layer 222 of build material particles 220 over a surface 224. The build material particles 220, the layer 222, and the surface 224 may respectively be equivalent to the build material particles 120, the layer 122, and the surface 124 discussed above with respect to FIG. 1. The recoater 218 may have a cylindrical configuration and may be rotated and translated over the build material particles 220 to position the build material particles 220 into the layer 222. By way of example, the recoater 218 may be formed of a metallic material and may have a polished or a textured surface. The recoater 218 may be employed to form the layer 222 to have a substantially uniform thickness across the surface 224. In other examples, the recoater 218 may be a doctor blade or other suitable device for spreading the build material particles 220 into a layer 222. In an example, the thickness of the layer 222 may range from about 90 µm to about 110 µm, although thinner or thicker layers may also be used. For example, the thickness of the layer 222 may range from about 20 µm to about 200 µm, or from about 50 µm to about 200 µm.

The processor 202 may fetch, decode, and execute the instructions 214 to control a delivery device 230 to deliver a light absorbing agent 232 onto selected areas of the layer 222 of build material particles 220. The delivery device 230 may be equivalent to the delivery device 110 and the light absorbing agent 232 may be equivalent to the light absorbing agent 112 discussed above with respect to FIG. 1. Accordingly, detailed descriptions of the delivery device 230 and the light absorbing agent 232 are not repeated with respect to FIG. 2.

The processor 202 may also fetch, decode, and execute the instructions 214 to control a second delivery device 240 to deliver a second agent 242 onto selected areas of the layer 222 of build material particles 220. The second delivery device 240 may be any suitable device for delivering a fluid, such as a thermal inkjet printhead, a piezoelectric printhead, or the like. Additionally, multiple second delivery devices 240 may be employed to deliver the second agent 242.

Generally speaking, the second agent 242 may have a property that differs from a property of the light absorbing agent 232 as discussed herein. For instance, the property may be color, and the second agent 242 may have a color that differs from the light absorbing agent 232. In this example, the second agent 242 may be a colored ink or dye that may be mixed with the light absorbing agent 232 to provide a desired color to the build material particles 220 and the light absorbing agent 232 may absorb UV light and heat the build material particles 220 to a sufficient temperature to cause the build material particles 220 to melt. Although not shown, the 3D printer 200 may include additional second delivery devices or the second delivery device 240 may include additional components to deliver multiple second agents 242 having different colors with respect to each other to thus form parts with the build material particles 220 having desired colors. By way of particular example, the second delivery device(s) 240 may deliver second agents having cyan, magenta, yellow, and black colors.

In addition, or in other examples, the property may be a light absorbing property, and the second agent 242 may also be a light absorbing agent that may absorb light in a different wavelength range than the light absorbing agent 232. By way of example, the second agent 242 may absorb light having wavelengths that are around the infrared (IR) wavelength range. The second agent 242 may also become heated through absorption of the IR light and may assist the light absorbing agent 232 in heating the build material particles 220 upon which the light absorbing agent 232 and the second agent 242 have been deposited. The second agent 242 may thus assist in heating the build material particles 220 upon which the second agent 242 has been deposited to melt and subsequently fuse together. According to an example, the second agent 242 may be deposited onto the build material articles 220 in instances in which the light absorbing agent 232 is unable to reach a required temperature to cause the build material particles 220 to sufficiently melt. In these examples, the second agent 242 may include any suitable fluid that may absorb light around the IR wavelength range and become heated.

The processor 202 may further fetch, decode, and execute the instructions 214 to control a third delivery device 250 to deliver a third agent 252 onto selected areas of the layer 222 of build material particles 220. The third delivery device 250 may be any suitable device for delivering a fluid, such as a thermal inkjet printhead, a piezoelectric printhead, or the like. Additionally, multiple third delivery devices 250 may be employed to deliver the third agent 252.

The third agent 252 may have a property that differs from a property of the light absorbing agent 232. The third agent 252 may also have a property that differs from a property of the second agent 242. In instances in which the second agent 242 is a light absorbing agent and/or a material property modifying agent, the third agent 252 may be a colored ink or dye that is to color the build material particles 220. In instances in which the second agent 242 is a coloring fluid, the third agent 252 may be a fluid that is to absorb light around the IR wavelength range. Thus, for instance, the processor 202 may control each of the delivery devices 230-250 to selectively apply an agent 232 that is to absorb light around the UV wavelength range, apply an agent 242 that is to absorb light around the IR wavelength range, and apply a colorant that is to color the build material particles 220. However, in other examples, the processor 202 may execute the instructions 214 to apply the light absorbing agent 232 without applying the second agent 242 or the third agent 252.

The processor 202 may further fetch, decode, and execute the instructions 216 to control a light source 260 to apply light 262 onto the layer 222 of build material particles 220 and the light absorbing agent 232 that has been delivered onto the build material particles 220. The light source 260 may be equivalent to the light source 130 and the light 262 may be equivalent to the light 132 discussed above with respect to FIG. 1. Accordingly, detailed descriptions of the light source 260 and the light 262 are not repeated with respect to FIG. 2.

Generally speaking, the light source 260 may apply light 262 in a broad spectrum of wavelengths to cause the light absorbing agent 232 that has been deposited on the build material particles 220 to be heated. For instance, in the broad spectrum of wavelengths may include wavelengths that are within the UV wavelength range. Additionally, in instances in which a second agent 242 is to absorb light around or near the IR wavelength range, the broad spectrum of wavelengths may include wavelengths that are within or near the IR wavelength range. In other examples, the light source 260 may apply light 262 in more focalized spectrums, e.g., around the UV wavelength range, around or near the IR wavelength range, or both of these wavelength ranges.

In any regard, application of the light 262 by the light source 260 may result in the light absorbing agent 232 and, in certain instances, the second agent 242, to become sufficiently heated to cause the build material particles 220 upon which the light absorbing agent 232 (and the second agent 242) has been deposited to melt. As discussed herein, the light absorbing agent 232 and the light source 260 may be tuned to the build material particles to cause this melting to occur. In addition, or in other examples, the light absorbing agent 232 and the second agent 242 may be tuned to sufficiently heat the build material particles 220 upon which the light absorbing agent 232 and the second agent 242 have been deposited to melt during application of light 262 onto those build material particles 220. That is, for instance, the amount of light absorbing agent 232 and the amount of second agent 242 deposited onto the build material particles 220 may be varied depending upon the amount of heating provided by each of the light absorbing agent 232 and the second agent 242 in the presence of the light 262. By way of particular example in which the light absorbing agent 232 and the second agent 242 generate different amounts of heat in the presence of the light 262, the amount of heat generated by the mixture of the agents 232 and 242 may be controlled by controlling the volumes of the delivered agents 232 and 242.

As different types of materials used to form the build material particles 220, different sizes of the build material particles 220, and/or different distributions of the build material particles 220 may require different levels of heat to be sufficiently melted for fusing, the processor 202 may vary operations of the delivery device 230 and the light source 260 for different types of build material particles and distributions. The processor 202 may also vary operations of the second delivery device 240 and the third delivery device 250 for different types of build material particles and distributions. The operations of each of the components for different types of materials, different particle sizes, and/or different distributions of particles, may be determined through testing, through modeling, or the like. Additionally, the determined operations may be stored in the data store 204 and the processor 202 may identify the operations to be performed from the determined operations stored in the data store 204. That is, the processor 202 may identify the certain operations to be performed during execution of the instructions 214 and 216 based upon inputted information pertaining to the build material particles 220, such as the type of material, the particle sizes, and/or the distribution of the particles that are to be performed to adequately melt the build material particles 220 to form 3D parts.

Figure 3:
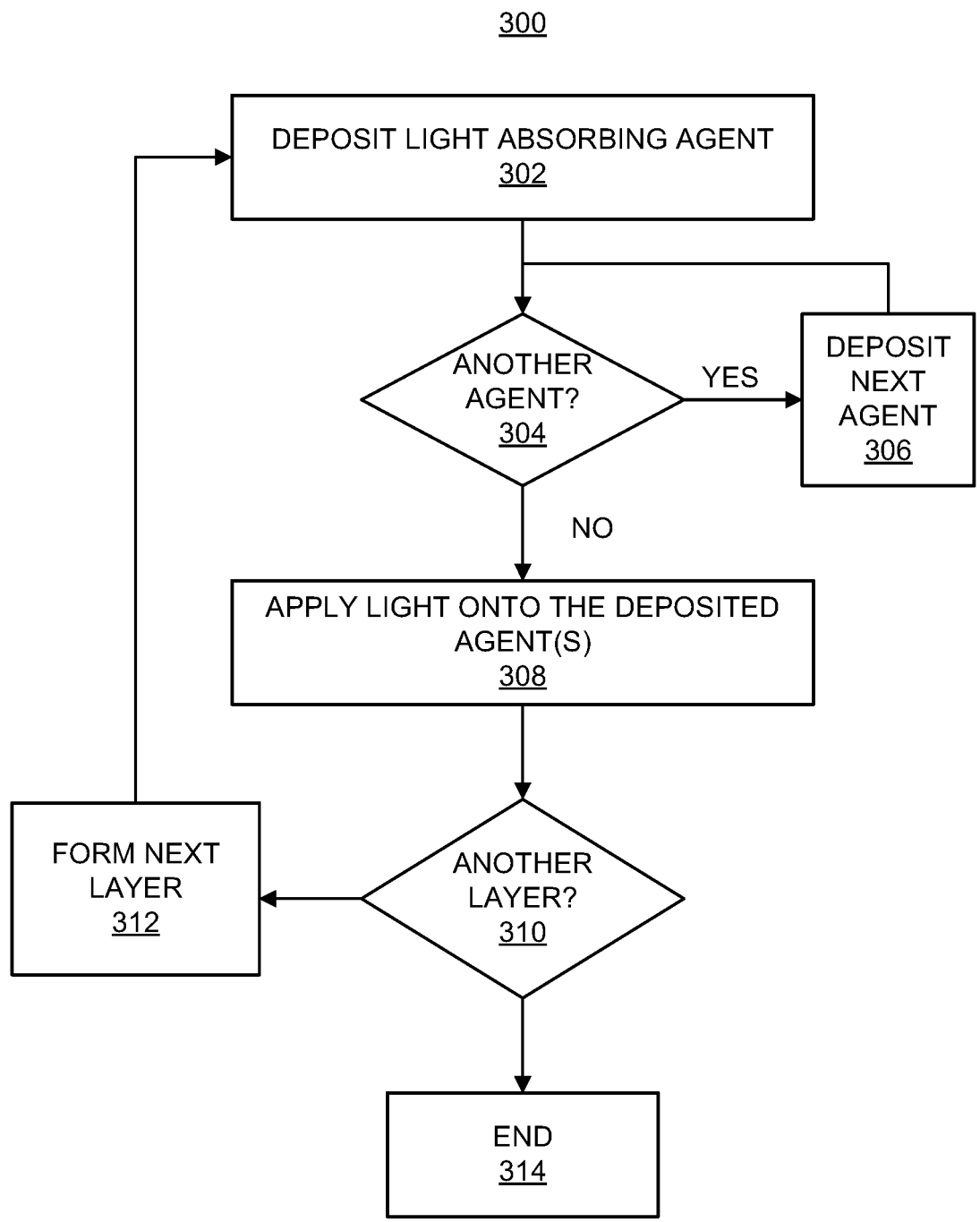
FIG. 3 depicts an example method for melting and fusing build material particles using a UV light absorbing agent.

Various manners in which the 3D printer 200 may be implemented are discussed in greater detail with respect to the method 300 depicted in FIG. 3. Particularly, FIG. 3 depicts an example method 300 for melting and fusing build material particles using a UV light absorbing agent. It should be apparent to those of ordinary skill in the art that the method 300 may represent a generalized illustration and that other operations may be added or existing operations may be removed, modified, or rearranged without departing from a scope of the method 300.

The description of the method 300 is made with reference to the 3D printer 200 illustrated in FIG. 2 for purposes of illustration. It should be understood that 3D printers having other configurations may be implemented to perform the method 300 without departing from a scope of the method 300.

At block 302, the processor 202 may execute the instructions 214 to deposit a light absorbing agent 232 onto selected areas of a layer 222 of build material particles 220. The light absorbing agent 232 may absorb light having wavelengths that are around the UV wavelength range and may convert the light into heat having a temperature that is sufficiently high to cause the build material particles 220 upon which the light absorbing agent 232 has been deposited to melt. According to an example, the processor 202 may execute the instructions 214 to control a delivery device 230 to deposit droplets of the light absorbing agent 232 onto the selected areas of the layer 222 of the material particles 220. The selected areas of the layer 222 may include the areas containing build material particles 220 that are to be fused together, for instance, to form a section of a 3D part.

At block 304, the processor 202 may determine whether another agent is to be applied onto the layer 222 of build material particles 220. The another agent may be either or both of the second agent 242 and the third agent 252 discussed above. Thus, for instance, in response to a determination by the processor 202 that the second agent 242 is to be applied, the processor 202 may execute the instructions 214 to control the second delivery device 242 deposit droplets of the second agent 242 onto selected locations of the layer 222, as indicated at block 306. As an example, the processor 202 may cause the second agent 242 to be applied onto the same selected locations on which the light absorbing agent 232 was applied. In addition, blocks 304 and 306 may be repeated for additional second agents 242 and/or the third agent 252 and the additional second agent 242 and/or the third agent 252 may be deposited at block 306.

In other examples, the light absorbing agent 232 may be mixed with the second agent 242 and/or the third agent 252 and the mixture may be deposited onto selected areas of the layer 222 at block 302. In these examples, blocks 304 and 306 may be omitted.

In any regard, following performance of blocks 302-306, the light absorbing agent 232 may have been deposited onto selected locations of the layer 222. As discussed above, the light absorbing agent 232 may be transparent or reflective in the visible spectrum and the build material particles 220 may have a white or a light color. In one regard, therefore, another colored fluid, such as the second agent 242, may not be applied onto the layer 222 in order to form the build material particles 220 into a white or light-colored part. However, in instances in which the second agent 242 is a fluid that is to absorb light around the near-IR wavelength range and is also transparent, the second agent 242 may also be applied onto the layer 222 to form the white or light-colored part.

In other examples in which the build material particles 220 are to be formed to have a particular color or colors, either or both of the second agent 242 and the third agent 252 may be deposited onto the selected locations of the layer 222. In these examples, the third agent 252 may have the particular color or colors.

At block 308, light 262 may be applied onto the light absorbing agent 232 to heat the deposited light absorbing agent 232 and cause the build material particles 220 upon which the light absorbing agent 232 has been deposited to melt and to subsequently fused together. That is, the melted build material particles 220 may fuse together following cessation of the application of light 262 onto the deposited light absorbing agent 232.

Additionally, at block 308, the light 262 may also be applied onto the second and/or third agents 242 and 252 in instances in which the second and/or third agents 242 and 252 have been deposited onto the layer 222. In instances in which the second agent 242 is to absorb light around the IR wavelength range, the second agent 242 may assist in heating the build material particles 220 to their melting temperatures as discussed in greater detail herein.

At block 310, the processor 202 may determine whether another layer 222 of the build material particles 220 is to be formed, for instance, based upon accessed information regarding a 3D part to be fabricated. In response to a determination that an additional layer 222 is to be formed, a next layer of build materials 220 may be formed on top of the previous layer 220, as indicated at block 312. For instance, the processor 202 may execute the instructions 212 to control the recoater 218 to spread additional build materials 220 across the previous layer 222. In addition, blocks 302-312 may be repeated until no additional layers are to be formed, at which point the method 300 may end, as indicated at block 314.

Some or all of the operations set forth in the method 300 may be contained as utilities, programs, or subprograms, in any desired computer accessible medium. In addition, the method 300 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method comprising:
depositing a light absorbing agent onto selected areas of a layer of build material particles, wherein the light absorbing agent absorbs light having wavelengths between 200 nanometers (nm) to 400 nm and converts the light into heat having a temperature that is sufficiently high to cause the build material particles upon which the light absorbing agent has been deposited to melt; and applying light onto the deposited light absorbing agent to heat the deposited light absorbing agent and cause the build material particles upon which the light absorbing agent has been deposited to melt and subsequently fuse together.

2. The method according to claim 1, further comprising: spreading a plurality of build material particles into the layer of build material particles prior to depositing the light absorbing agent onto the selected areas of the layer of build material particles, wherein the build material particles of the plurality of build material particles and the layer of build material particles are white or transparent and the light absorbing agent is transparent or reflective in a visible spectrum.

3. The method according to claim 1, further comprising: depositing a second agent onto the selected areas of the layer of build material particles to mix the second agent with the light absorbing agent at the selected areas, wherein the second agent has a property that differs from a property of the light absorbing agent, and wherein the second agent is to at least one of absorb light in a different wavelength range than the UV wavelength range, change a color of the build material particles, and modify a material property of the build material particles.

4. The method according to claim 3, wherein the second agent absorbs light having wavelengths that are in the infrared wavelength range and becomes heated and wherein the light absorbing agent and the second agent are tuned to sufficiently heat the build material particles upon which the light absorbing agent and the second agent have been deposited to melt during application of the light.

5. The method according to claim 1, wherein depositing the light absorbing agent further comprises applying different volumes of the light absorbing agent to different selected areas of the layer of build material particles to vary amounts of heating applied to the different areas of the layer of build material particles.

* * * * *